(12) United States Patent
Tran

(10) Patent No.: US 9,360,366 B1
(45) Date of Patent: Jun. 7, 2016

(54) SELF-REFERENCING SPECTROMETER ON MOBILE COMPUTING DEVICE

(71) Applicant: Chuong Van Tran, Santee, CA (US)

(72) Inventor: Chuong Van Tran, Santee, CA (US)

(73) Assignee: Chuong Van Tran, Santee, CA (US)

( * ) Notice: Subject to any disclaimer, the term of this patent is extended or adjusted under 35 U.S.C. 154(b) by 0 days.

(21) Appl. No.: 14/879,037

(22) Filed: Oct. 8, 2015

(51) Int. Cl.
*G01J 3/28* (2006.01)
*G01J 3/10* (2006.01)
*H04M 1/725* (2006.01)
*G01J 3/02* (2006.01)

(52) U.S. Cl.
CPC ............... *G01J 3/10* (2013.01); *G01J 3/0272* (2013.01); *G01J 3/2803* (2013.01); *H04M 1/72527* (2013.01)

(58) Field of Classification Search
CPC ............ G01J 3/28; G01J 3/10; G01J 3/0272; G01J 3/18; G01J 3/36
USPC .................................................. 356/300–445
See application file for complete search history.

(56) References Cited

U.S. PATENT DOCUMENTS

2005/0041248 A1\* 2/2005 Imura ....................... G01J 3/28
356/328

\* cited by examiner

*Primary Examiner* — Abdullahi Nur

(57) ABSTRACT

This invention discloses a self-referencing spectrometer that simultaneously auto-calibrate and measure optical spectra of physical object utilizing shared aperture as optical inputs. The concurrent measure and self-calibrate capabilities makes it possible as an attachment spectrometer on a mobile computing device without requiring an off-line calibration with an external reference light source. Through the mobile computing device, the obtained spectral information and imagery captured can be distributed through the wireless communication networks.

31 Claims, 12 Drawing Sheets

- -1<sup>TH</sup> ORDER REGION 302
- 0<sup>TH</sup> ORDER REGION 300
- 1<sup>TH</sup> ORDER REGION 304
- 306 SELF REFERENCING (SRL) LIGHT SPECTRUM BAND CAPTURED ON CCD
- 308 EXTERANAL ILLUMINATION LIGHT (EIL) UNDER TEST SPECTRUM BAND CAPTURED ON CCD

- 310 GRAGPH OF 1<sup>TH</sup> ORDER REGION 304 MEASURED WITH SMARTPHONE
- 312
- 314

604
CALCULATED
WAVELENGTHS OF EIL
FLUORESCENCE BULB
UNDER TEST

606
GUI STARTING SCREEN

SELF-REFERENCING SPECTROMETER ON MOBILE COMPUTING DEVICE

REFERENCES CITED

U.S. Patents Documents

U.S. Pat. No. 6,043,893 Mar. 28, 2000 Trelman, et al.
U.S. Pat. No. 6,774,368 B2 Aug. 10, 2004 Busch, Kenneth et al.
U.S. Pat. No. 7,019,833 B2 Mar. 28, 2006 Harnisch
U.S. Pat. No. 7,199,876 B2 Apr. 3, 2007 Mitchell
U.S. Pat. No. 8,947,656 B2 Feb. 3, 2015 Cunningham
2003/0136837 Jul. 24, 2003 Amon et al.
2006/0082760 Apr. 20, 2006 Lin.
2006/0279732 Dec. 14, 2006 Wang
2008/0174768 A1 Jul. 24, 2008 Belz

BACKGROUND OF THE INVENTION

1. Field of the Invention

This invention relates generally to optical spectrometer and more specifically to an optical spectrometer on mobile computing device that simultaneously self-referencing and measuring an optical spectrum of a physical object through a shared aperture as optical inputs.

2. Description of the Prior Art

Mobile computing device, especially smartphone, typically has advanced features integrated beyond making voice calls. With the integration of SoC, system-on-a-chip, high resolution camera, internet connection capability, touch-screen display, data storage capability, smartphone is able to provide extensive user-friendly services. Affordable smartphone peripheral device can enable the smartphone with a built-in camera to sense wavelength information. For example, Breslauer et al., Plos One, vol. 4, Mar. 2, 2009, Mobile Phone Based Clinical Microscopy for Global Health Application, demonstrated a proof of concept that, with an external optical configuration in front of the camera, a smartphone may function as a spectrometer.

However, wavelength accuracy of spectrometers must be calibrated in advance to establish the relation between the pixel number and the associated wavelength by means of a using a calibration lamp with known emission line wavelengths. In addition, a recalibration has to be performed periodically since the pixel number versus wavelength relation can change with ambient temperature variations, or disturbance to the optical configuration in front of the camera, or the variations of the auto-focusing lens position commonly occurs in smartphone. Given that this calibration procedure has to be performed off-line, it would be desirable to address the need for a smartphone-based optical spectrometer that has simultaneous self-referencing and spectrum measurement capabilities to achieve excellent wavelength reproducibility.

There is considerable prior art in the development and mechanism and operation of optical spectrometers, spectrophotometers, calorimeters, and the like devices for measuring the light wavelength that is reflected, transmitted or scattered from physical objects.

Among the proposed portable spectrometer solutions were:

In U.S. Pat. No. 6,043,893 (Trelman, Allan, et al.) discloses a manually portable spectrometer and method of detection of absorption and reflection of light.

In U.S. Pat. No. 7,019,833 B2 (Harnisch, Berad) discloses a miniature high resolution optical spectrometer.

In U.S. Pat. No. 7,199,876 B2 (Mitchell, Thomas) discloses a compact hyper spectral imager.

Among the proposed solutions for self-referencing spectrometers were:

In U.S. Pat. Application Publication No. 2008/0174768 A1 (Belz, Mathias) discloses A light emitting diode (LED) based detection system is employed for spectroscopy based application. LEDs are used as monochromatic light sources for applications at specific and pre-defined wavelengths.

In U.S. Pat. No. 6,774,368 B2 (Busch, Kenneth et al) discloses a dispersive, diffraction grating, NIR spectrometer that automatically calibrates the wavelength scale of the instrument without the need for external wavelength calibration materials.

Among the proposed solutions for portable spectrometer utilizing mobile computing devices were:

In U.S. Pat. No. 8,947,656 B2 to Cunningham discloses a mobile computing device that includes an image sensor to detect the result of a biomolecular assay that may be determined from the wavelength spectrum.

In U.S. Patent Application No. 2003/0136837 to Amon et al discloses a method and a system for security documents are authenticated through the methods of imaging, spectroscopy, etc.

In U.S. Patent Application No. 2006/0082760 to Lin discloses an optical sensing module to capture a group of images of a fingerprint on a finger of the user of the mobile phone.

In U.S. Patent Application No. 2006/0279732 to Wang et al discloses a spectroscopic sensor that is integrated with a mobile communication device that is capable of measuring optical spectra.

However, none of these prior art addresses the need for a low-cost optical spectrometer using the camera in a mobile computing device that simultaneously self-referencing and measure optical spectrum of physical object. It is therefore an aim of the present invention to provide a novel system that can simultaneously self-referencing and measure of spectral characteristics in real time with the use of software App for a mobile computing device to enhance the visual interpretation of the spectrum that will provide spectral wavelength information inexpensively.

BRIEF SUMMARY OF THE INVENTION

In a first aspect, example embodiments provide a system comprising an external illumination light source, a self-referencing optical module consists of: a calibration light source, a common aperture sharing slit, a lens, and a diffraction grating wherein the optical output is dispersed into spatially-separated wavelength components, a mobile device includes an image sensor simultaneously detects the dispersed optical output of the calibration light source and the dispersed optical output of the external illumination light source wherein these two dispersed patterns are distinctly separated from each other as formed on the image sensor.

The external illumination light source could be a broadband or narrowband light source. The calibration light source could be a broadband LED wherein the LED emission spectra wavelength peaks could be red, green, and blue light which represent the three calibration wavelength peaks. Although LED's wavelengths can drift due to changes in temperature, stable wavelengths can be achieved by driving them in constant current mode. Alternatively optical interference filter could be used to reduce the spectral bandwidth of LED wherein optical filter performance could be designed to achieve one or multiple narrow reference bandpass that represent the calibration wavelength peaks of interest. The optical filter is placed between the LED and the common aperture sharing slit wherein the LED light transmits through the optical filter to produce narrow optical bandpass which would be less susceptible to temperature changes wherein improve accuracy of calibration wavelengths. Other alternate calibration light source could be laser diode wherein multiple laser diode could be used to create multiple narrow reference wavelengths of interest.

The self-referencing optical module could include an attachment for mounting the mobile computing device in a predetermined position relative to optical output of the self-referencing optical module. The mobile computing device could be a smartphone or other easily portable computing device with a built-in camera to sense wavelength information. In some examples, the mobile computing device with the integration of SoC, system-on-a-chip, high resolution camera, internet connection capability, touch-screen display, data storage capability, and program instructions that enable the mobile computing device to perform functions, such as: (i) using the image sensor to simultaneously acquire the spatially-separated wavelength components from both the calibration light source and the external illumination light source under test; (ii) automatically self-referencing and determining wavelengths of the spatially-separated wavelength components of the external illumination light source; and (iii) displaying the identification of the spatially-separated wavelength components of the external illumination light source on the display. The functions could include additional analytical results of the optical spectrum such as color temperature, relative color index, wherein tailored to end user applications on the display.

In a second aspect, example embodiments provide a method for making the aforesaid invention are included. The claimed method may involve the following: exposing the physical object under test to external illuminated light source to produce an optical output of spatially separated wavelength components; using the image sensor to simultaneously acquire regions of interest surrounding the spatially-separated wavelength components from both the calibration light source and the external illumination light source; and identifying the wavelengths components of the physical object exposed to external illumination. The claimed method further discloses the detail of the calibration process which can be used to carry out an automatic, and therefore real time self-referencing, spectral calibration of the spectrometer.

The method may involve a moveable mount to pivot or translate the self-referencing optical module out of the optical path of the image sensor on the mobile computing device such that the camera on the mobile computing device can take normal color picture for purpose of documenting the test and environment conditions under testing. In some embodiment, mounting the computing device to the instrument could involve coupling a light source on the mobile computing device, such as its built-in LED, to the optical input of the self-referencing optical module, wherein the optical input could be directly in front of the shared aperture slit or in front of the interference optical filter.

In a third aspect, example embodiments provide an optical instrument. The optical instrument comprises a self-referencing optical module consists of a calibration light source, a common aperture sharing slit, a lens, and a diffraction grating wherein the optical output is dispersed into spatially-separated wavelength components, A mobile device includes an image sensor simultaneously detects the dispersed optical output of the calibration light source and the dispersed optical output of the external illumination light source wherein these two dispersed patterns are distinctly separated from each other as formed on the image sensor.

In some embodiments, a light source on the mobile computing device (such as an LED) may be used as both an external illumination light source for the measuring object under test and as calibration light source wherein, one of the optical path of the LED light source could be coupled through the interference optical filter of the self-referencing optical module to provide alternate means of having one or more narrow calibration peak wavelengths.

DETAILED DESCRIPTION OF THE INVENTION

In example embodiment, the mobile computing device is mounted to holds one or more optical components in alignment with the image sensor. With the mobile computing device properly mounted, the image sensor can be used obtain one or more images from which the wavelength spectrum of an optical output can be determined. In this way, the image sensor of a mobile computing device can perform the function of a high resolution spectrometer.

Figure 1:
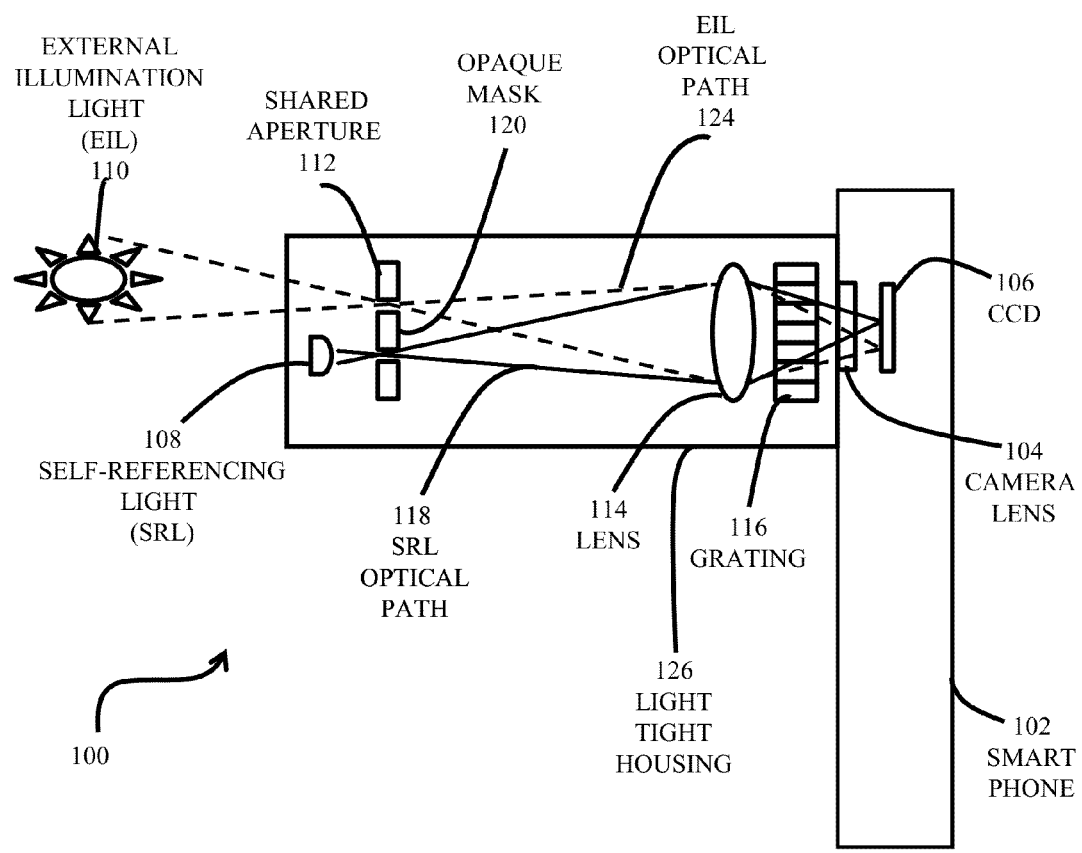
FIG. 1 is a schematic diagram showing the optical components of the self-referencing smartphone spectrometer system

FIG. 1 is a schematic diagram illustrating an example smartphone-based spectrometer system consists of a self-referencing optical module 100 aligned to a smartphone 102 with a digital camera which includes a camera lens 104 and an image sensor (CCD) 106.

The self-referencing optical module 100 consists of a calibration LED light source 108, a shared aperture 112 (slit aperture length=3 mm, width=0.200 microns), an opaque mask 120 (mask length=1 mm, width=1 mm) centered to the shared aperture 112, a collimator lens 114 (focal length of 24 mm), a diffraction grating 116 (500 lines/mm), and a light tight housing 126.

As shown in FIG. 1, all incoming light from both the Self-Referencing Light (SRL) 108 and the External Illumination Light (EIL) 110 transmitting through a shared aperture 112, an opaque mask 120 obscures the center portion of the shared aperture 112 which separates incoming light at the common aperture sharing slit 112 into two distinct optical paths 118 and 124. Wherein the optical path 118 represents light coming from the SRL 108 whereas the optical path 124 represents light coming from the EIL 110 such as sunlight, external incandescent lamp, fluorescent lamp or LED.

Light from both optical paths 118 and 124 transmits through a collimator lens 114, passes through a diffraction grating 116 which disperses the wavelength components of the incoming light. The dispersed light transmits through the entrance pupil of the smartphone's camera lens 104 to focus the dispersed wavelength components across the CCD 106 as two distinct optical spectrums with an offset from each other representative of light from optical paths 118 and 124. In the example, the collimated light is set at normal incident angle with respect to the diffraction grating 116 so that the camera receives the grating's $0^{th}$ order, −1st order, and +1st order, which will be described in more details in FIG. 3.

Figure 2:
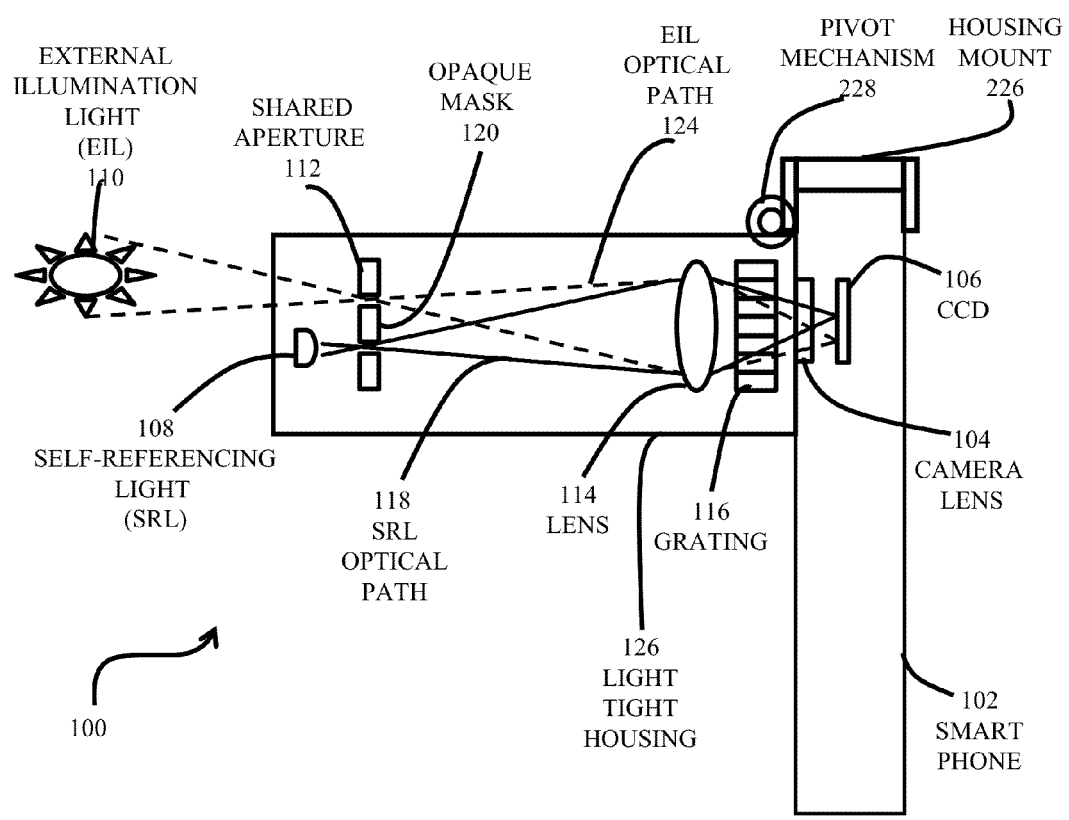
FIG. 2 is a diagram showing example mounting of the self-referencing spectrometer input optical module to the smartphone.

FIG. 2 shows the alignment of the self-referencing optical module 100 to the smartphone 102 with a housing mount 226. The positioning of the housing mount 226 ensures that the dispersed optical output path from the self-referencing optical module 100 can be coupled into the smartphone image sensor CCD 106. The housing mount 226 includes a mechanism 228 to allow the self-referencing optical module 100 to move out of the camera lens 104 field of view. Thus enabled the smartphone camera to capture additional normal RGB color imagery of object under test. The housing mount 226 can be machined out of aluminum or can be made using other structural materials.

Figure 3A:
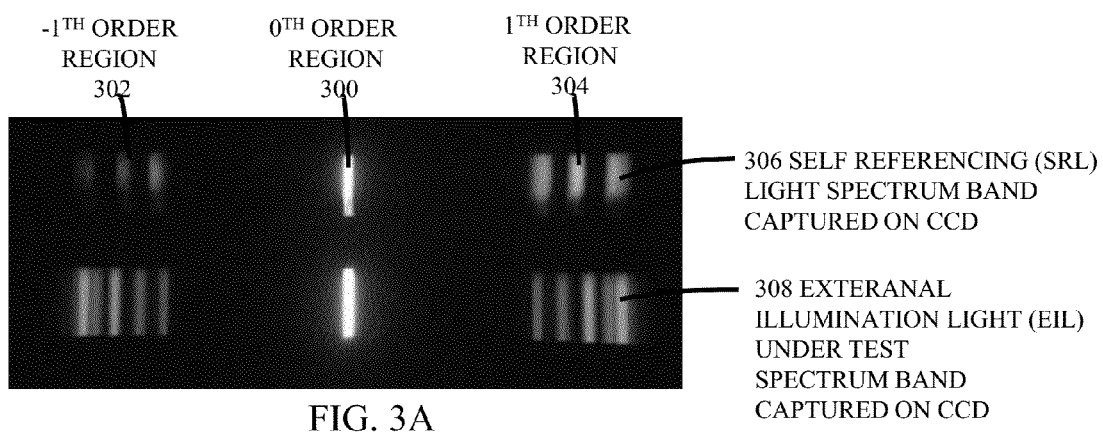
FIG. 3A shows example image spectrum as it may be displayed on a smartphone.

FIG. 3A shows an example of simultaneously captured both the SRL spectrum band 306 (not shown in color) and the EIL of fluorescence lamp spectrum band 308 (not shown in color) on the camera CCD. Example spectrum bands 306 and 308 also show the 0th Diffraction Order 300, −1st Diffraction Order 302, +1st Diffraction Order 304.

Figure 3B:
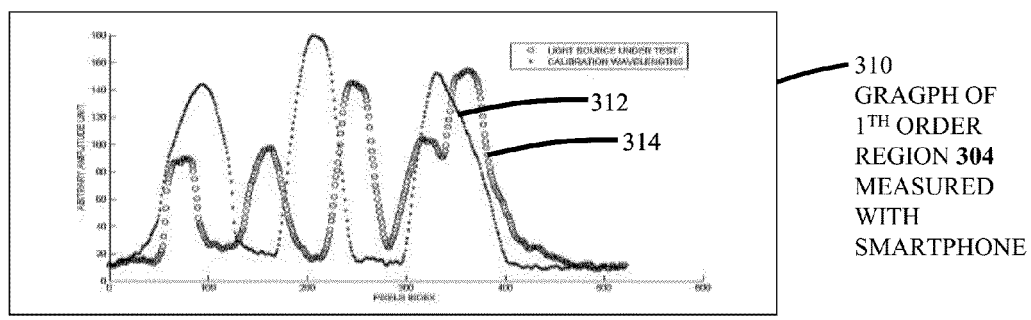
FIG. 3B is a graph of the calculated wavelength spectrum of FIG. 3A.

FIG. 3B is an example graph 310 showing intensity variation profile along the dispersive direction of the +1st order region 304. The solid dotted line profile 312 represents the SRL spectrum band 306, whereas the white dotted line profile 314 represents the EIL band under test 308. The example +1st Diffraction Order region 304 covers approximately 500 pixels in the dispersive direction. It is common practice to perform wavelength calibration of the spectrometer, where the pixel number of the CCD is associated with the corresponding wavelength or spectral band. By performing a regression procedure, a calibration polynomial is obtained to convert every pixel value into a wavelength and therefore can calculate all unknown wavelengths of the spectrum band.

Figure 4:
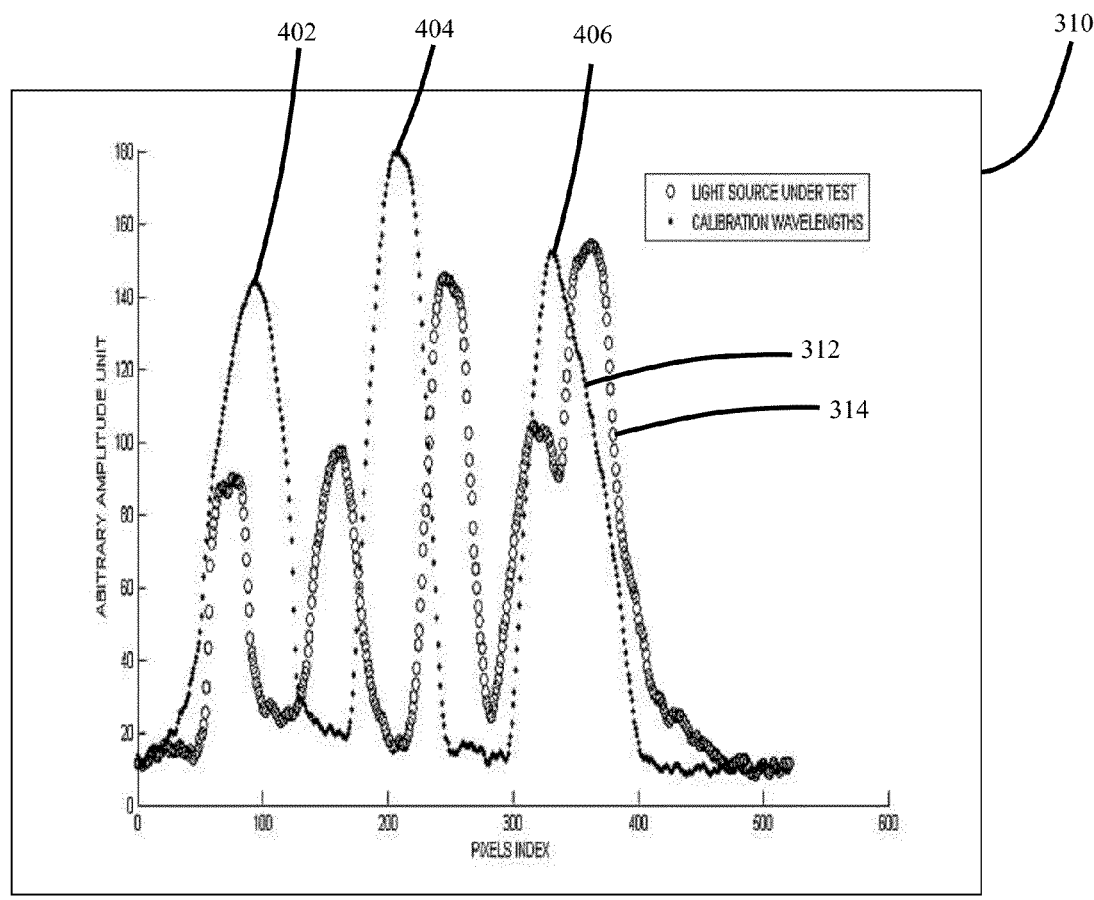
FIG. 4 is graph showing the self-referencing wavelengths peaks versus pixel indices of FIG. 3B.

FIG. 4 shows example of the SRL graph 312 with its three peaks 402, 404, and 406 that represent the SRL calibration wavelengths at 445 nm, 520 nm, and 600 nm respectively. Wherein, the first peak 402 associates wavelength 445 nm with pixel index 100 in the x-axis, the second peak 404 associates wavelength 520 nm with pixel index 205, the third peak 406 associates wavelength 600 nm with pixel index 320. In the example, assuming linearity between the image pixel value and wavelength, the conversion factor to convert every pixel value into a wavelength is 0.705 nm per pixel thus a calibration polynomial can be established as pixel indices to wavelengths transform.

As shown previously in FIG. 3A, the spectrum band the EIL under test 308 is always acquired simultaneously with the SRL spectrum band 306 thus the two spectrum bands would always have the same spatial relationship to each other per image acquisition since all incoming light entered the same shared aperture as optical inputs. In the example, the spectrum band the EIL under test 308 will then have the same conversion factor of 0.705 nm per pixel like that of the self-referencing light (SRL) spectrum band 306.

However, the calibration polynomial needs to be recalculated in real time as the pixel index versus wavelength relation exhibits dependencies on the ambient temperature or any disturbance to the aligned position of the self-referencing optical module 100 with respect to a smartphone 102 as shown previously in FIG. 1. In the application of the smartphone spectrometer, the pixel number versus wavelength relation changes constantly due to the continuous autofocus operation of the camera lens to obtain highest spatial resolution image and the variations of the mounting position each time the spectrometer is removed and re-mounted onto the smartphone. Therefore, simultaneously acquiring both spectrum for the SRL 108 and EIL under test 110 is the requirement to maintain accuracy of the recorded spectrum for the physical object under test.

Figure 5:
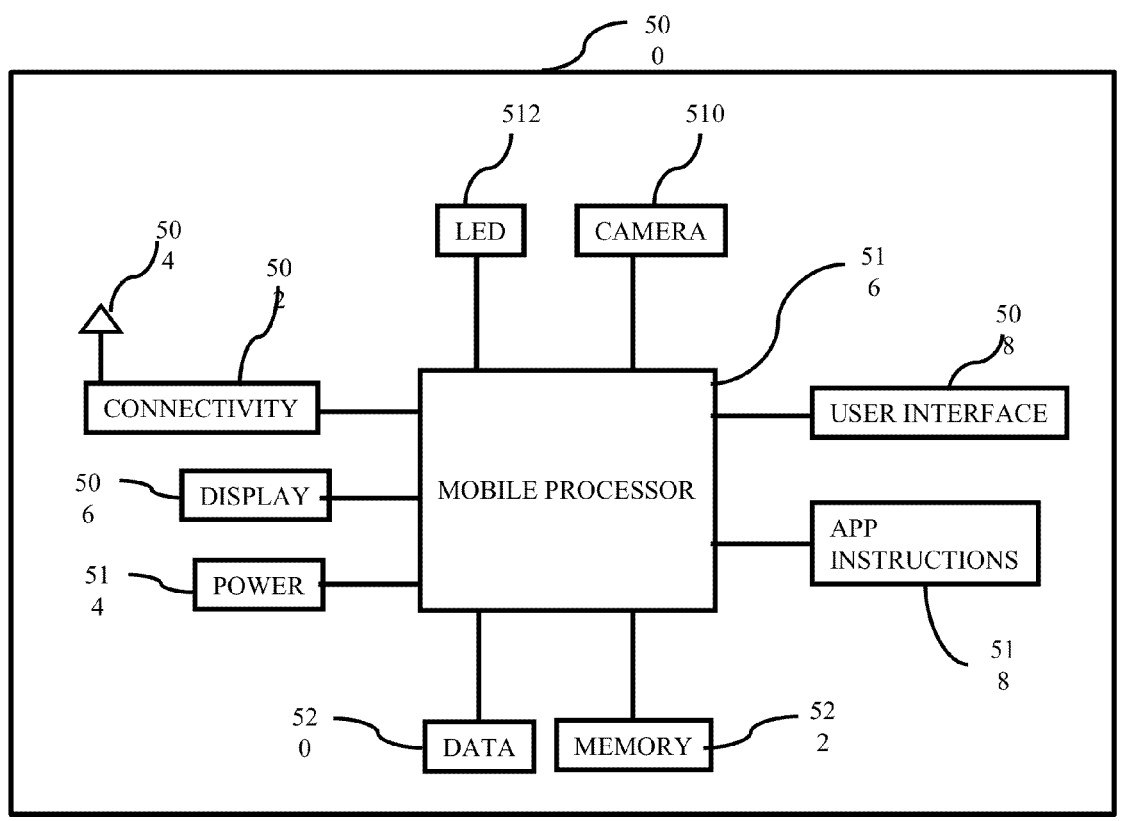
FIG. 5 is a block diagram of an example mobile computing device.

FIG. 5 is a block diagram illustrating example mobile computing device 500. The mobile computing device 500 could be a smartphone, a tablet, or other handheld portable computing device. The mobile computing device 500 includes a connectivity interface 502 for wireless communication via an RF antenna 504. The wireless communication use protocols such as WiFi or Bluetooth to send and receive voice, imagery, or other information data. Instead of or in addition to connectivity interface 502, the mobile computing device 500 may include other wired connections connectivity interfaces such as USB or Ethernet for connectivity.

The mobile computing device 500 is able to capture imagery through the use of a camera 510 that includes a lens and an imaging sensor. The camera 510 could be on either side of the mobile computing device 500. The camera 510 could be integrated with the self-referencing optical module as a stand-alone spectrometer module, wherein a stand-alone spectrometer module could communicate wirelessly or wired to the mobile computing device 500. The mobile computing device 500 may also include a light source, such as a white LED 512, next to the camera 510. The LED 512 may be intended for flash photography, or low light video, or fitted with an optical filter designed with a simultaneous multi-color bandpass of interests.

The mobile computing device 500 may be controlled by a mobile processor 516 by accessing applications program instructions 518 and their associated data 520 stored in memory 522. The memory 522 could include random access memory (RAM), read only memory (ROM), or any other type of memory media such as removable flash memory card. The mobile processor 516 may execute the program instruction 518 to cause the mobile computing device 500 to perform functions such as sending and receiving data 520 via the connectivity interface 502, using camera 510 to obtain spectral imagery of physical object illuminated by the LED 512, displaying user interface 508 data inputs on the display 506, The program instructions 518 may include software for one or more applications (often known as "Apps"), such as a spectrometer app that can be accessed by the user, or self-managed for power saving by the power module 514 of the mobile device.

Figure 6A:
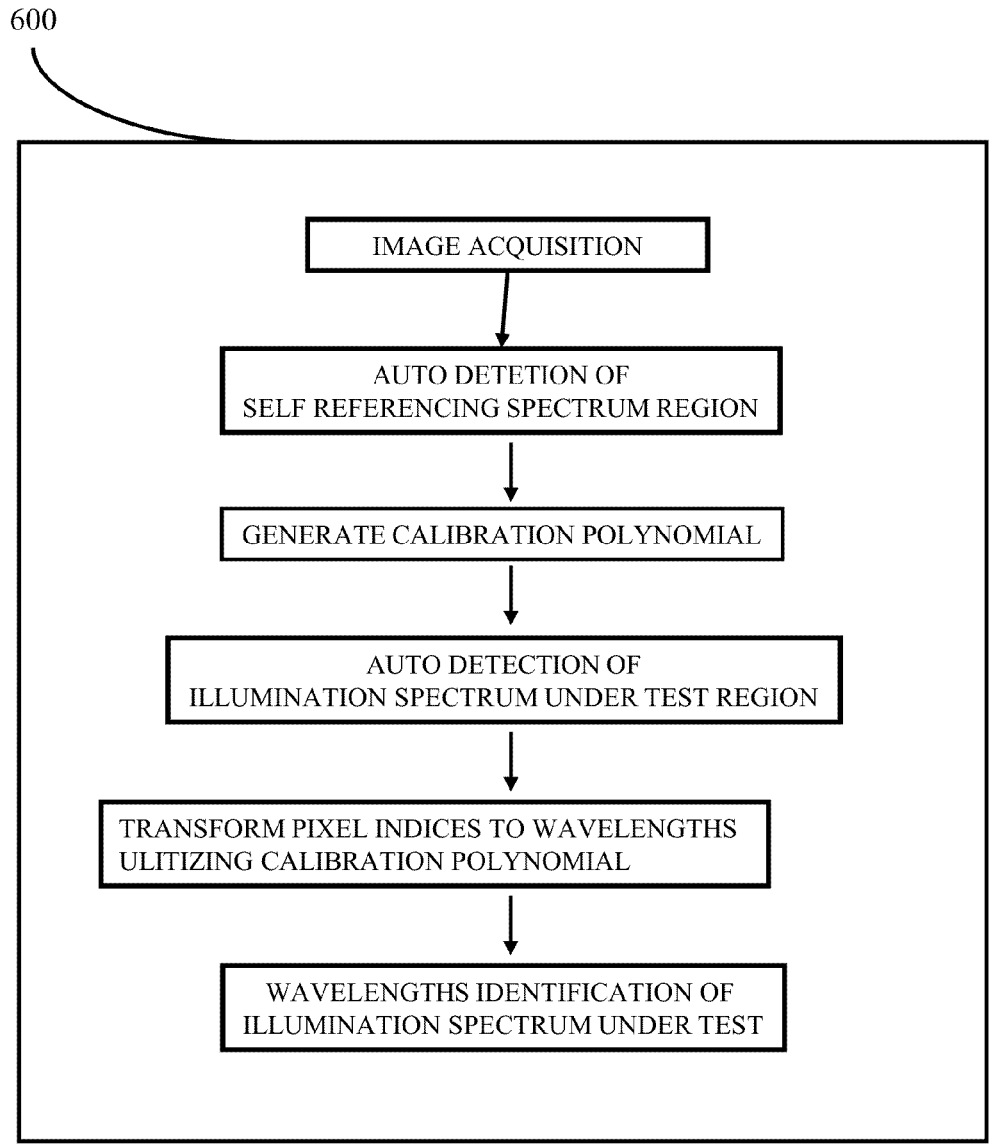
FIG. 6A shows block diagram of spectrum detection analysis process.
Figure 6B:
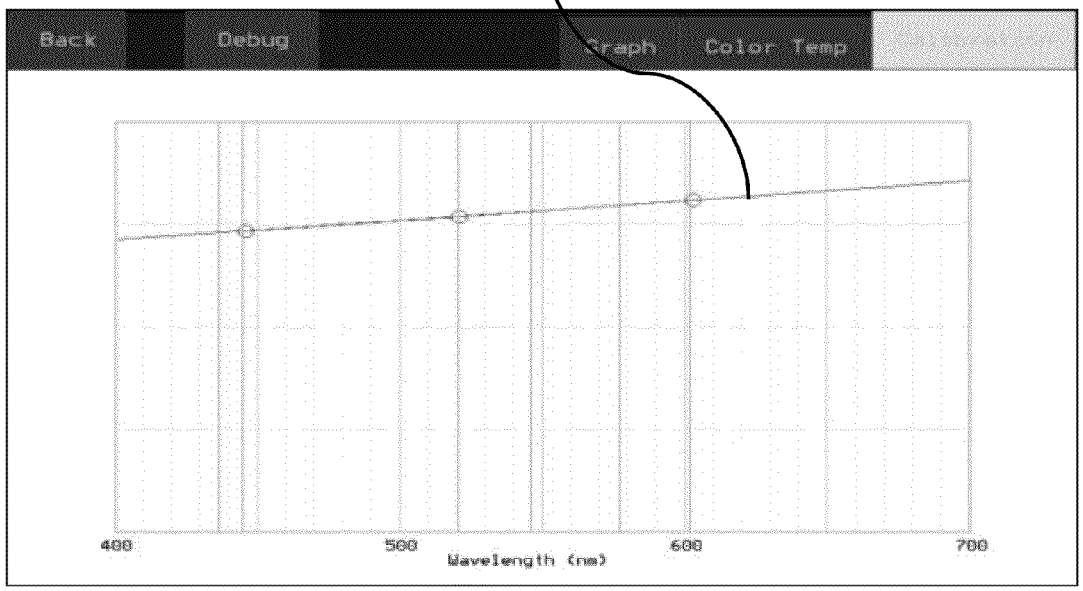
FIG. 6B-6E show screen views of example smartphone software App.
Figure 6C:
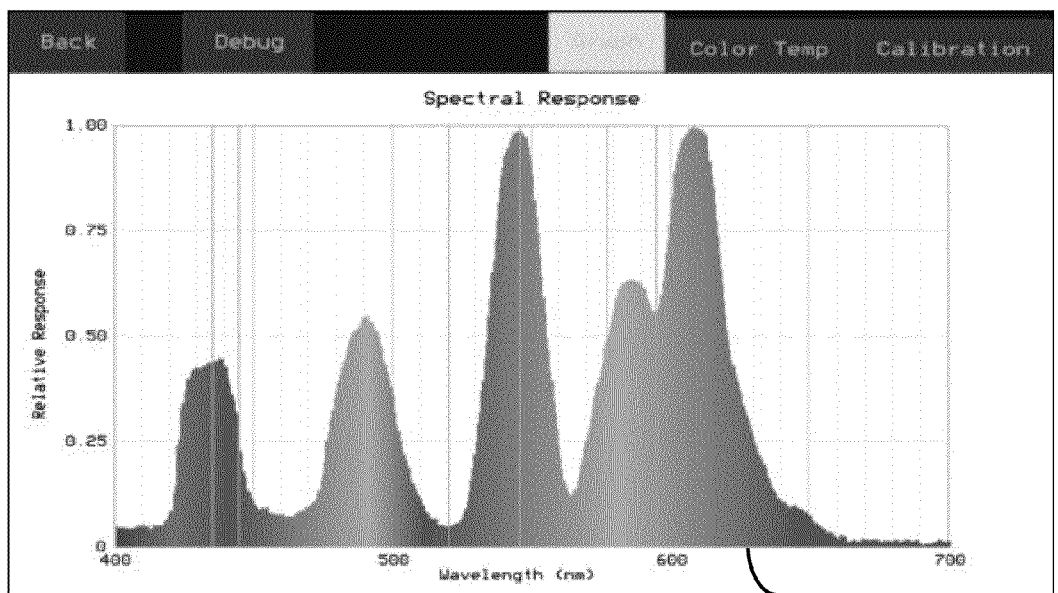
Figure 6D:
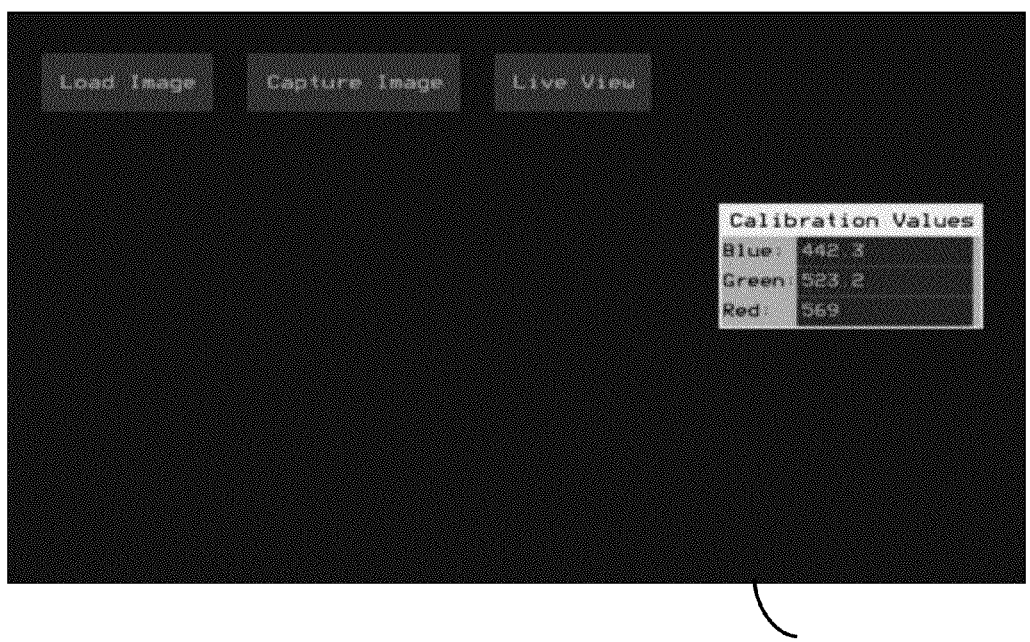
Figure 6E:
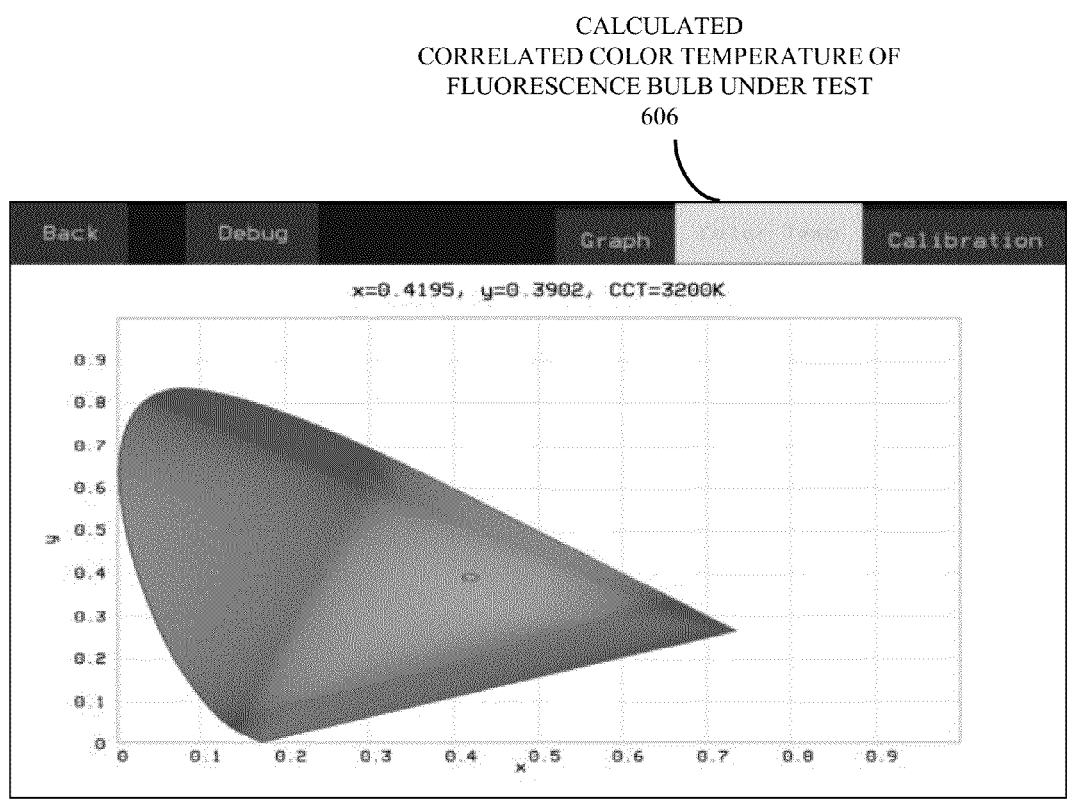

A smartphone spectrometer App was developed for use to detect wavelengths spectrum of physical test object. As shown in the block diagrams of FIG. 6A, after launching the App and select the "take picture" button, the App processes the following events: A spectra image is captured. The App auto select the self-referencing light (SRL) spectrum region. Utilizing the calibration wavelengths of the SRL pre-stored in App calibration file, a regression method is used to generate a calibration polynomial transfer function. The App then auto select the external illumination light (EIL) under test spectrum region. The App applies the calibration polynomial transfer function to the EIL under test spectrum to convert pixel indices to wavelengths measurement. The process of the capturing spectrum can also enable wireless transmission of spectrum measurements FIG. 6B-6E are examples screen views of the App. FIG. 6B shows example of the generated calibration polynomial that converts pixel indices to wavelengths measurement from the pre-stored calibration wavelengths file. FIG. 6C shows example of EIL fluorescence detected wavelengths measurement after applying the calibration polynomial transfer function (not shown in color). FIG. 6D shows example of the Graphical User Interface (GUI) showing the user the image acquisition options, wherein the user could load a previous saved spectrum image, capture a spectrum image with the still camera, or view it in the live video mode. FIG. 6E shows example of calculated color temperature of external illumination light (EIL) under test plotted in the CIE chromaticity graph (not shown in color).

Figure 7:
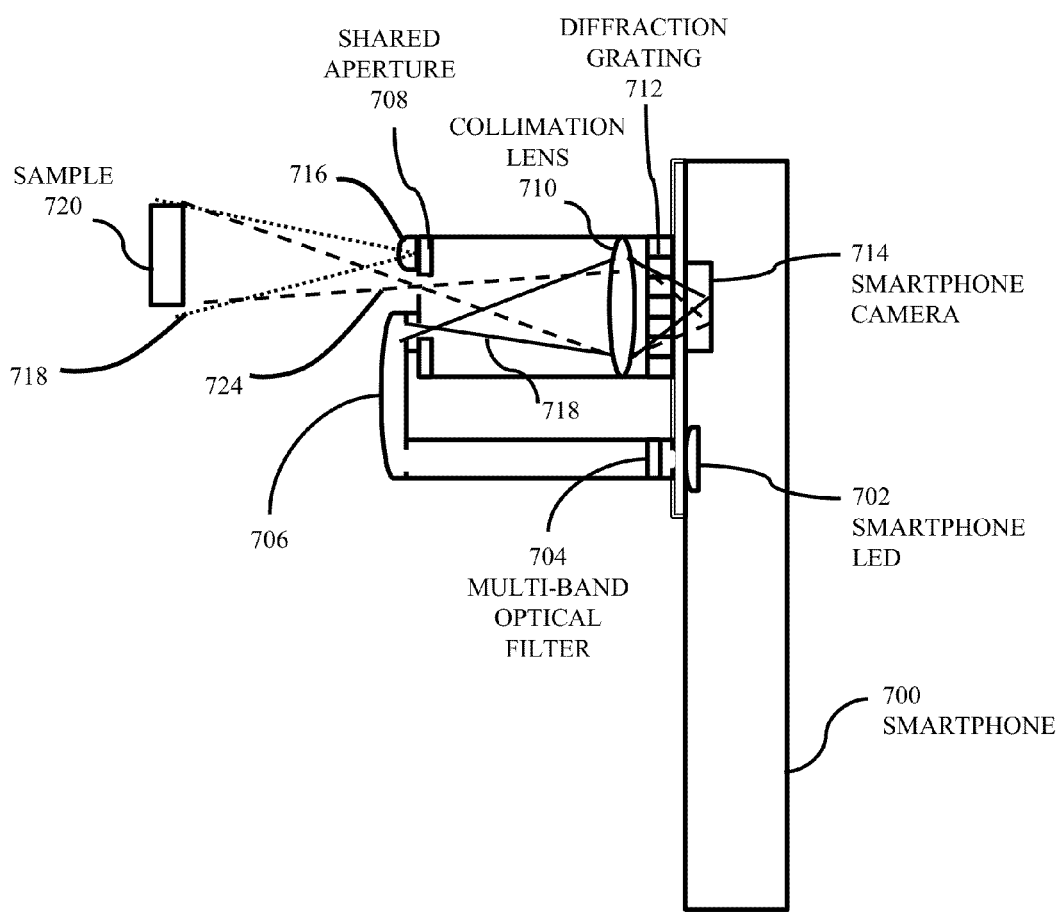
FIG. 7 is a schematic diagram showing a self-referencing spectrometer aligned to the integrated LED and camera of the smartphone.

FIG. 7 shows alternate example configuration of the self-referencing spectrometer optical module. The self-referencing optical path 718 represents light from the smartphone LED 702 passes through a multi-band optical filter 704. Wherein the optical filter 704 is designed to have the required self-referencing calibration wavelengths. Light exits the optical filter 704 propagates along a light pipe 706 then transmits through the shared aperture 708, passes through a collimator 710, then passes through diffraction grating 712. The light from the diffraction grating 712 enters through the entrance pupil of the smartphone camera lens to reach the image sensor of the camera 714 and appears in a digital image obtained by the smartphone 700 having discreet color bands corresponds to the design of the multi-band optical filter 704. Wherein, the multi-band optical filter 704 provides simultaneous multi-color narrow-bands representing the calibration wavelengths.

The second optical path 724 represents light coming an External Illumination Light (EIL) 716 (i.e. LED, Sun), incidents on sample under test 720 from the LED optical light path 718, reflected light represents by optical path 724 enters the shared aperture, passes through a collimator 710, then passes through diffraction grating 712. The light from the diffraction grating 712 enters through the entrance pupil of the smartphone camera lens to reach the image sensor of the camera 714 and appears in a digital image obtained by the smartphone 702 as a "rainbow" type pattern spectrum band (i.e. wavelengths from about 400 nm to about 700 nm for the visible spectrum). Thus for every image acquisition by the camera, both the self-referencing light spectrum and the external illumination light spectrum are captured simultaneously.

Figure 8:
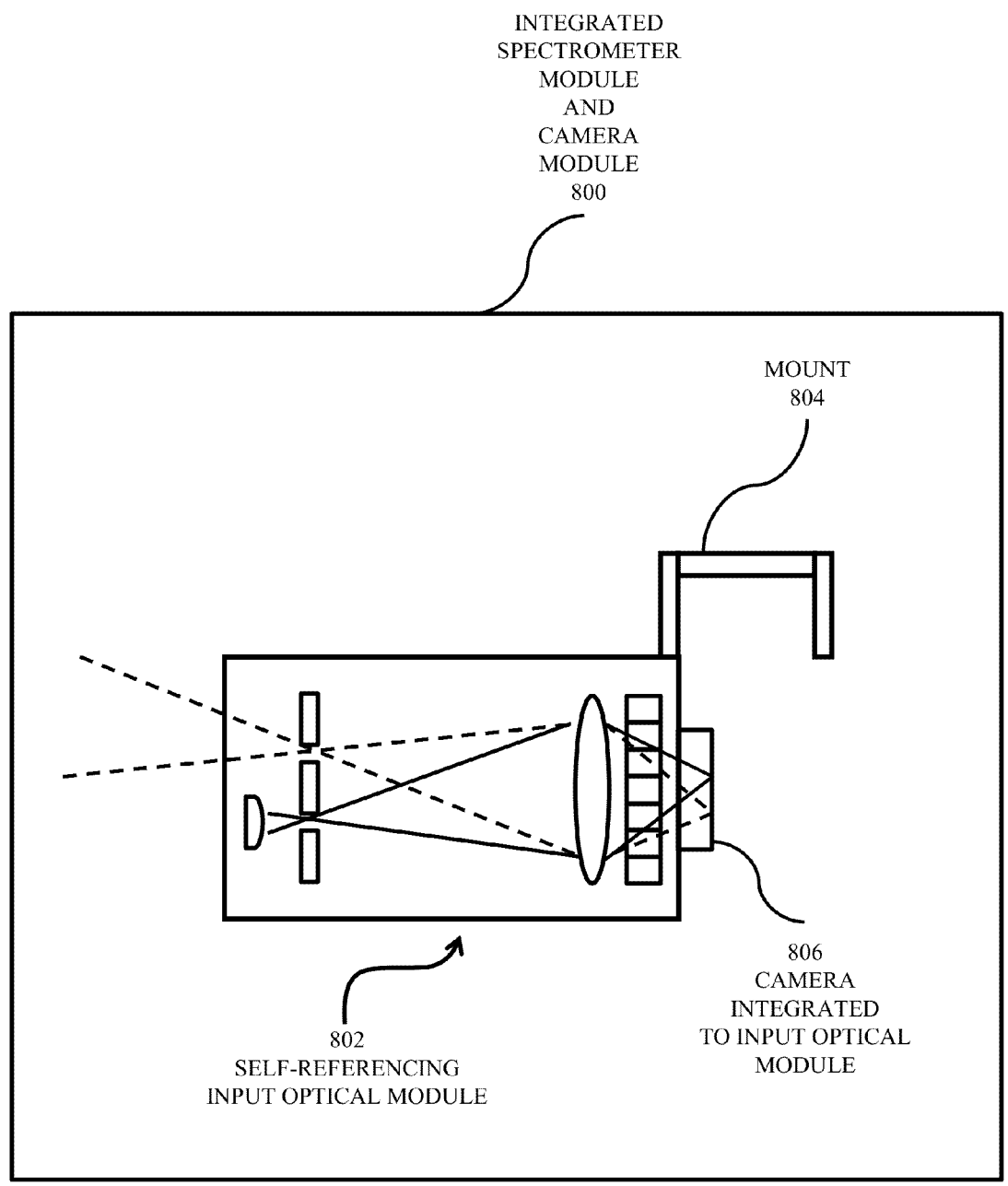
FIG. 8 is a schematic diagram showing example of integrated self-referencing optical module and camera with removably mounting to the smartphone.

FIG. 8 shows an alternate example configuration in which the self-referencing optical module 802 is integrated with a camera 806 to form a spectrometer module. Wherein the spectrometer module could include a wired or wireless connectivity to the mobile computing device, wherein the App from the mobile computing device could be used to read in imagery data and perform spectrum analysis. A mounting structure 804 provides a mean to quickly fasten the spectrometer module to a mobile computing device.

CLOSING STATEMENT

Having thus described in detail a preferred embodiment of the SELF-REFERENCING SPECTROMETER ON MOBILE COMPUTING DEVICE of the present invention, it is to be appreciated and will be apparent to those skilled in the art that many changes not exemplified in the detailed description of the invention could be made without altering the inventive concepts and principles embodied therein. It is also to be appreciated that numerous embodiments incorporating only part of the preferred embodiment are possible which do not alter, with respect to those parts, the inventive concepts and principles embodied therein. The presented embodiments are therefore to be considered in all respects exemplary and/or illustrative and not restrictive, the scope of the invention being indicated by the appended claims, and all alternate embodiments and changes to the embodiments shown herein which come within the meaning and range of equivalency of the appended claims are therefore to be embraced therein.

What is claimed is:

1. A system, comprising:
a mobile computing device, wherein the mobile computing device includes an image sensor, a processor, a light source, and a memory that stores program instructions;
an optical instrument, comprising:
a self-referencing optical module, wherein the self-referencing optical module includes a calibration light source, a shared aperture, a collimator lens, and a diffraction grating to disperse optical output of the calibration light, wherein the dispersed patterns (self-referencing and the external illumination light under test) are separated from each other as formed on the image sensor simultaneously; and
a mount for positioning the mobile computing device in a position relative to the self-referencing optical module, wherein in the position the image sensor of the mobile computing device is optically aligned to the output optical path of the self-referencing optical module such that the image sensor receives at least a portion of the dispersed optical output and different wavelength components are received at different locations on the image sensor, wherein the program instructions stored in the memory are executable by the processor to cause the mobile computing device to perform functions, the functions comprising:
Using the image sensor to obtain simultaneously the dispersed optical outputs of the self-referencing and the external illumination light under test; and determining a wavelength spectrum of the optical output of the external illumination light under test.

2. The system of claim 1, wherein the mobile computing device is a smartphone.

3. The system of claim 1, wherein the self-referencing light source is a narrow-band light source.

4. The system of claim 1, wherein a narrow-band light source is the LASER.

5. The system of claim 1, wherein the LASER has a single calibration wavelength.

6. The system of claim 1, wherein the LASER has a multi-band set of simultaneous multi-color calibration wavelengths.

7. The system of claim 1, wherein the external illumination light source is a broadband light source.

8. The system of claim 1, wherein a broadband light source is the broadband LASER.

9. The system of claim 1, wherein the broadband LASER has a multiband set of simultaneous multi-color calibration wavelengths.

10. The system of claim 1, wherein a broadband light source is the light emitting diode (LED).

11. The system of claim 1, wherein the LED has a multi-band set of simultaneous multi-color calibration wavelengths.

12. The system of claim 1, wherein the multiband set is multiband optical filter.

13. The system of claim 1, wherein the multiband optical filter is an interference optical filter.

14. The system of claim 1, wherein the shared aperture is an "air" mask.

15. The system of claim 1, wherein the shared aperture is a light transmission substrate mask.

16. The system of claim 1, wherein the shared aperture a single aperture.

17. The system of claim 1, wherein the shared aperture a multiple-aperture.

18. The system of claim 1, wherein the shared aperture has an obscure opaque mask.

19. The system of claim 1, wherein the opaque mask is centered to the shared aperture dimensions.

20. The system of claim 1, wherein the opaque mask is moveable within the shared aperture dimensions.

21. The system of claim 1, wherein the opaque mask isolates optical path of self-referencing from optical path of the external illumination light under test.

22. The system of claim 1, wherein the opaque mask dimensions prevent light interference between optical path of self-referencing and optical path of the external illumination light under test.

23. The system of claim 1, wherein the wavelength dispersive element is a diffraction grating.

24. The system of claim 1 dispersed optical outputs of the self-referencing and the external illumination light under test are emission spectrum simultaneously.

25. The system of claim 1 dispersed optical outputs of the self-referencing and the external illumination light under test are reflection spectrum simultaneously.

26. The system of claim 1 dispersed optical outputs of the self-referencing and the external illumination light under test are absorption spectrum simultaneously.

27. The system of claim 1 dispersed optical outputs of the self-referencing and the external illumination light under test are diffusion spectrum simultaneously.

28. The system of claim 1 dispersed optical outputs of the self-referencing and the external illumination light under test are fluorescence spectrum simultaneously.

29. The system of claim 1, wherein the mobile computing device further includes a display and wherein the functions further compromise: displaying an indication of the wavelength spectrum simultaneously for the self-referencing and the external illumination light under test on the display.

30. The system of claim 1, wherein the fixed position a user interface of the mobile computing device is accessible.

31. The system of claim 1, wherein the position is removable allowing camera to take normal color imagery.

* * * * *